United States Patent
Meggiolan et al.

(10) Patent No.: US 7,866,045 B2
(45) Date of Patent: *Jan. 11, 2011

(54) METHOD FOR USE IN MANUFACTURING A BICYCLE SPOKED WHEEL

(75) Inventors: Mario Meggiolan, Vicenza (IT); Maurizio Passarotto, Rovigo (IT)

(73) Assignee: Campagnolo S.r.l., Vicenza (IT)

( * ) Notice: Subject to any disclaimer, the term of this patent is extended or adjusted under 35 U.S.C. 154(b) by 813 days.

This patent is subject to a terminal disclaimer.

(21) Appl. No.: 11/707,519

(22) Filed: Feb. 16, 2007

(65) Prior Publication Data

US 2007/0144008 A1 Jun. 28, 2007

Related U.S. Application Data

(63) Continuation of application No. 10/704,467, filed on Nov. 7, 2003, now Pat. No. 7,178,239.

(30) Foreign Application Priority Data

Nov. 8, 2002 (EP) .................................. 02425686

(51) Int. Cl.
*B21K 1/34* (2006.01)
*B23P 19/04* (2006.01)
*B60B 1/02* (2006.01)
*B60B 21/06* (2006.01)
*B60B 21/00* (2006.01)

(52) U.S. Cl. .............................. 29/894.342; 29/894.33; 29/894.341; 29/433; 29/464; 301/58; 301/95.104; 301/95.106

(58) Field of Classification Search ................................. 29/894.33–894.345, 433, 464; 301/58, 95.104, 301/95.106

See application file for complete search history.

(56) References Cited

U.S. PATENT DOCUMENTS

| | | | |
|---|---|---|---|
| 3,758,931 | A | 9/1973 | Patterson |
| 4,040,671 | A | 8/1977 | Hersh |
| 4,574,446 | A | 3/1986 | Kaufeldt et al. |
| 4,909,576 | A | 3/1990 | Zampieri |
| 5,522,630 | A | 6/1996 | James |
| 5,975,646 | A | 11/1999 | Campagnolo |
| 6,036,279 | A | 3/2000 | Campagnolo |
| 6,089,672 | A | 7/2000 | Chen |
| 6,126,243 | A | 10/2000 | Okajima et al. |
| 6,378,953 | B2 | 4/2002 | Mercat et al. |
| 6,557,946 | B1 | 5/2003 | Gerrit et al. |
| 6,938,962 | B1 | 9/2005 | Schlanger |

(Continued)

FOREIGN PATENT DOCUMENTS

DE    412 7500 C1    10/1992

(Continued)

*Primary Examiner*—David P Bryant
*Assistant Examiner*—Sarang Afzali
(74) *Attorney, Agent, or Firm*—Volpe and Koenig PC

(57) ABSTRACT

A method intended for manufacturing a bicycle spoked wheel is described. By inserting the nipples or barrels for the attachment of the spokes in the spoke attachment seats from the inside of the spoke attachment chamber through a suitably sized opening, instead of from the outside, the rim of the bicycle wheel can be manufactured without additional openings, even when using conventional nipples or barrels.

43 Claims, 6 Drawing Sheets

U.S. PATENT DOCUMENTS

Figure 1:
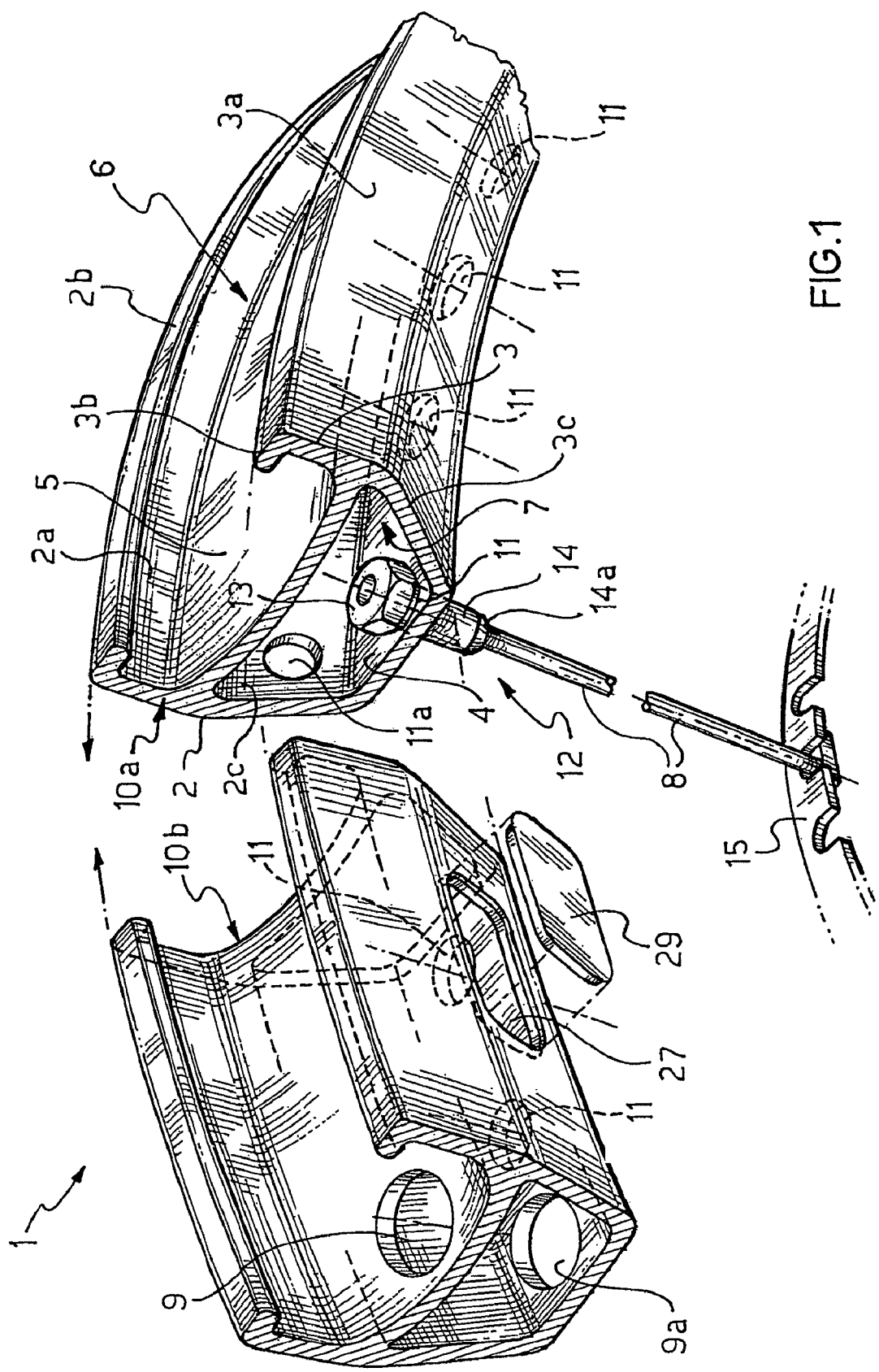

| | | |
|---|---|---|
| 2001/0005913 A1 | 7/2001 | Elsener et al. |
| 2001/0019222 A1 | 9/2001 | Campagnolo |
| 2004/0139609 A1 | 7/2004 | Meggiolan et al. |

FOREIGN PATENT DOCUMENTS

| | | |
|---|---|---|
| DE | 444 4044 A1 | 6/1996 |
| EP | 089 6886 A1 | 1/1999 |
| EP | 110 1631 A1 | 5/2001 |
| EP | 116 7078 A1 | 1/2002 |
| EP | 123 1077 A2 | 8/2002 |
| JP | 33006601 | 5/1933 |
| JP | 49042132 | 11/1974 |
| JP | 57091603 | 6/1982 |
| JP | 59193702 | 12/1984 |
| JP | 60012315 | 1/1985 |
| JP | 60157901 | 8/1985 |
| JP | 61118801 | 7/1986 |
| JP | 01226401 | 9/1989 |
| JP | 2003260901 | 9/2003 |
| WO | 0232695 | 4/2002 |

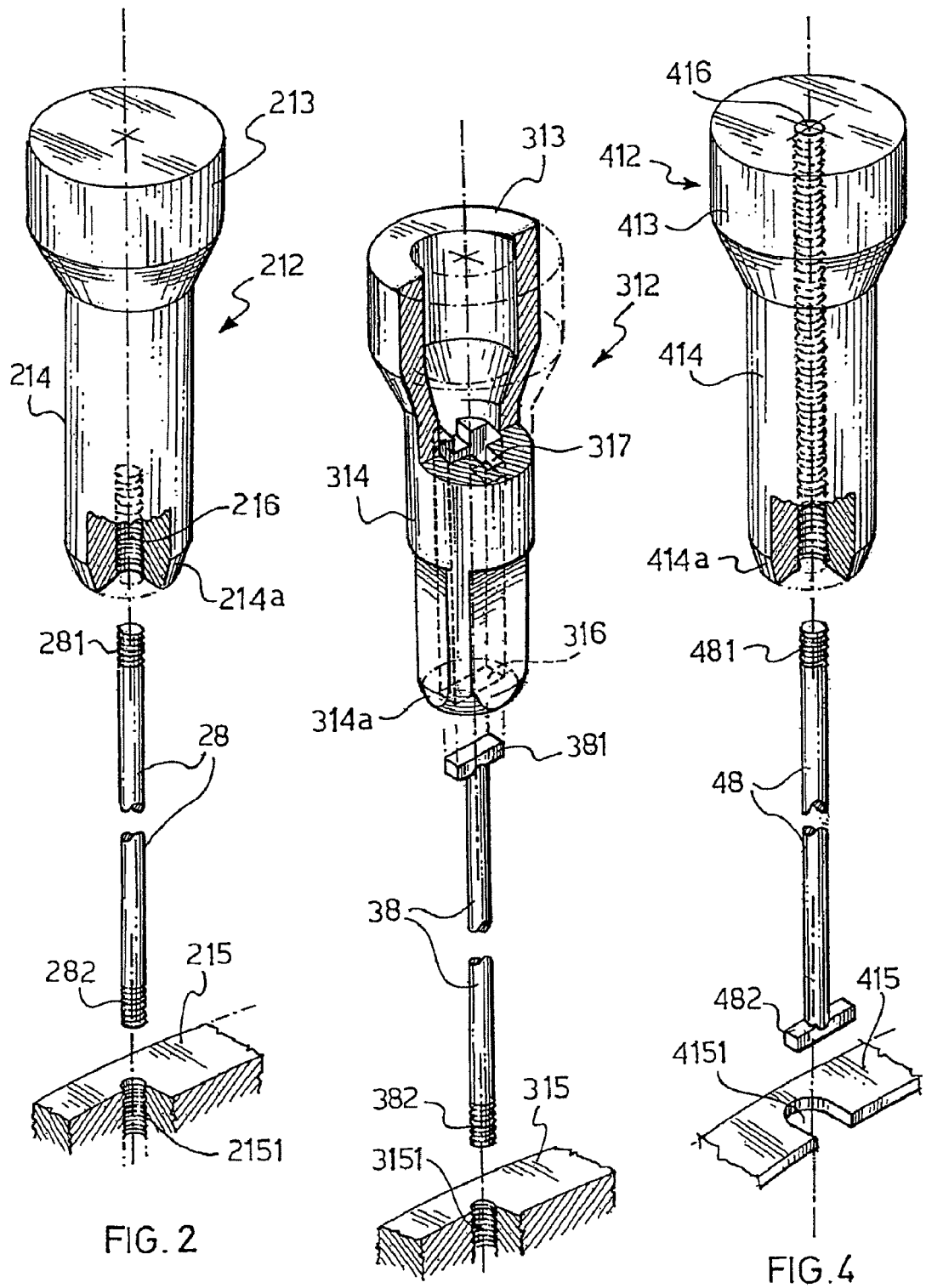

METHOD FOR USE IN MANUFACTURING A BICYCLE SPOKED WHEEL

CROSS REFERENCE TO RELATED APPLICATION(S)

This application is a continuation of U.S. patent application Ser. No. 10/704,467, filed on Nov. 7, 2003, which is incorporated by reference as if fully set forth.

BACKGROUND

A spoked wheel for a bicycle comprises a peripheral crown or rim, a central hub and a plurality of spokes extending between the hub and the rim. The tension of the spokes are usually adjustable at the hub and/or at the rim. This tension is usually adjusted by providing threading at one end of the spokes and a threaded hole attachment at the hub or the rim, respectively. The second end of the spokes can be provided with a second threading or a head, for example rectangular or circular, housed in a suitable seat, for example hooked in a hub flange or inserted in a bayonet coupling at the rim, respectively.

Rims having a channel, with fins where the beads of the tire are coupled and at the bottom of which a plurality of holes are made, are known. The holes receive a spoke attachment element provided with a hole with a shaped seat or with a threaded hole. The length of the hole threading of the spoke attachment element can be equal to the spoke threading, or else longer to also allow the tension adjustment of the spoke by varying the screwing-in depth of the spoke in the threaded hole of the spoke attachment element. By way of terminology, the spoke attachment elements are also called "nipples", if they allow tension adjustment of the spoke, or else "barrels" if they do not allow this.

Single channel rims have low structural stiffness and therefore greater deformability from lateral loads. Moreover, such single channel rims are not suitable for use with tubeless tires since the coupling channel is not airtight.

To increase structural stiffness, rims having two chambers, a circumferentially external tire coupling chamber and a circumferentially internal spoke attachment chamber, are also known. More specifically, such rims are made up of two side walls connected or filleted at one end by a circumferentially internal wall or lower bridge and at an intermediate point by a circumferentially external wall or upper bridge or partition, so as to have a substantially inverted A-shaped cross-section. The circumferentially external portions of the side walls, typically provided with a border, form the tire coupling channel with the upper bridge or partition, whereas the circumferentially internal portions of the side walls form, with the lower bridge and the upper bridge, a spoke attachment chamber.

Instead of a single chamber, two or more chambers can be provided through one or more partition walls, extending substantially parallel to the upper bridge or substantially transversal to it. Each wall (upper bridge, lower bridge, side and partition walls) can also be shaped in various ways, forming a complex cross section of the rim.

Rims of this type can be manufactured by casting of carbon fiber (see for example the European patent application No. 02002949.9 and publication No. 1,231,077 A2). Alternatively, such rims are manufactured by extrusion of an aluminum profiled bar. The profiled bar is shaped as a circle usually by calendaring and its terminal ends are joined by welding, for example flash welding or TIG welding, by cementing after insertion of a metallic sleeve, by pin-connection or otherwise.

With these types of rims, the problem is how to attach spokes in respective spoke attachment seats provided in the spoke attachment chamber(s), using the aforementioned spoke attachment elements.

In a first solution, described in U.S. Pat. No. 5,975,646 assigned to Campagnolo S.r.l., this is carried out by forming a plurality of access openings in the upper bridge, each at a respective spoke attachment seat. Such access openings allow insertion of the spoke attachment elements (nipples or barrels) and of the tool for screwing them onto the spokes or for holding them during the attachment of the spokes. To preserve a suitable structural stiffness of the rim, the upper bridge must however be thick, with a consequent undesirable weight increase of the rim. Moreover, such a rim is not suitable for tubeless tires since the tire coupling channel is not airtight because the aforementioned access openings are not airtight.

U.S. Pat. No. 6,474,746 assigned to Campagnolo S.r.l., avoids this and provides a rim in which the upper bridge has just a hole for the inflation valve for the tire and therefore is sufficiently rigid and light, as well as suitable for use with tubeless tires. The reference proposes to use supports having a seat for supporting a respective nipple at least partially outside of the rim section. Each nipple support comprises a substantially U-shaped bracket having the seat and hung on a pivot extending transversally between a pair of non-threaded holes formed in the side walls of the circumferentially internal chamber, or in flanges protruding from the side walls of the circumferentially internal chamber. Regarding such a solution, besides the nipples, additional elements are necessary, with consequent additional assembly steps. The solution also creates weak points in the rim.

Other known solutions for providing a rim in which the upper bridge has just the hole for the inflation valve of the tire and therefore sufficiently rigid and light, as well as suitable for use with tubeless tires, are described in European patent applications EP 0 896 886 A1, EP 1 101 631 A1, EP 1 167 078 A1, all assigned to Mavic S. A. In all three references, the spoke attachment seats are threaded holes in which a threaded end of a spoke, a spoke attachment element such as a nipple or a barrel, or an insert in which to insert a nipple or a barrel are screwed from the outside of the chamber. Since the thickness of the rim walls must be small for weight reasons, it is necessary to form the threaded holes by material deformation, so that a "chimney" is created in which a threading of the required length can be formed. Regarding these solutions, they are complex and expensive since forming the threaded holes in the lower bridge or in any case in the walls of the circumferentially internal chamber is a difficult and complex process.

Therefore, a simple and cost-effective solution to manufacture a spoked wheel for a bicycle, sufficiently strong while still being light, is still desirable.

SUMMARY

The problem can be solved by inserting the nipples or barrels in the spoke attachment seats from the inside of the spoke attachment chamber instead of from the outside, having previously inserted them in the chamber from an opening of proper size. When it is desired to make the bicycle wheel suitable for use with a tubeless tire, the opening can simply be formed so as not to jeopardize the airtight seal of the tire coupling channel.

A method for manufacturing a bicycle spoked wheel is disclosed, comprising the following steps: First, providing a rim element comprising: i) a tire coupling channel; and ii) at least one spoke attachment chamber with at least one opening, a plurality of spoke attachment seats, an inside area within the chamber, and an outside area outside the chamber. Second, inserting a spoke attachment element inside the at least one spoke attachment chamber through the at least one opening, the spoke attachment element comprising: i) a head; ii) a shank suitable for extending through and protruding from the spoke attachment seat; and iii) means for attaching the spoke attachment element to a spoke. Third, guiding the spoke attachment element to the spoke attachment seat. Fourth, aligning the shank of the spoke attachment element with the spoke attachment seat. Fifth, holding the spoke attachment element aligned with the spoke attachment seat.

BRIEF DESCRIPTION OF THE DRAWING(S)

Figure 5:
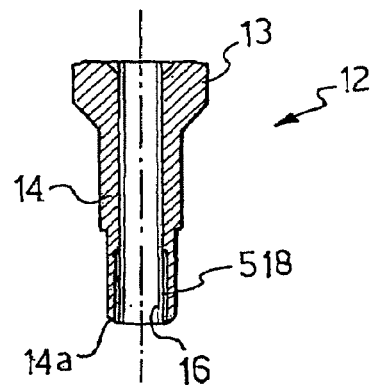
Figure 6:
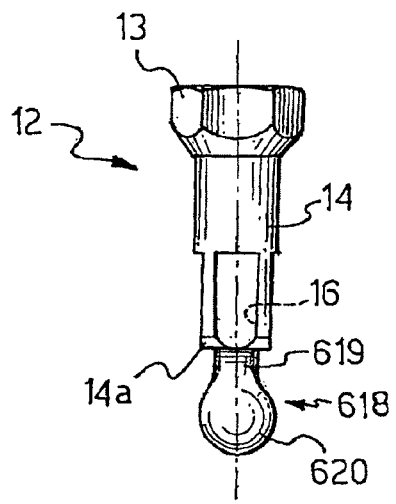
Figure 7:
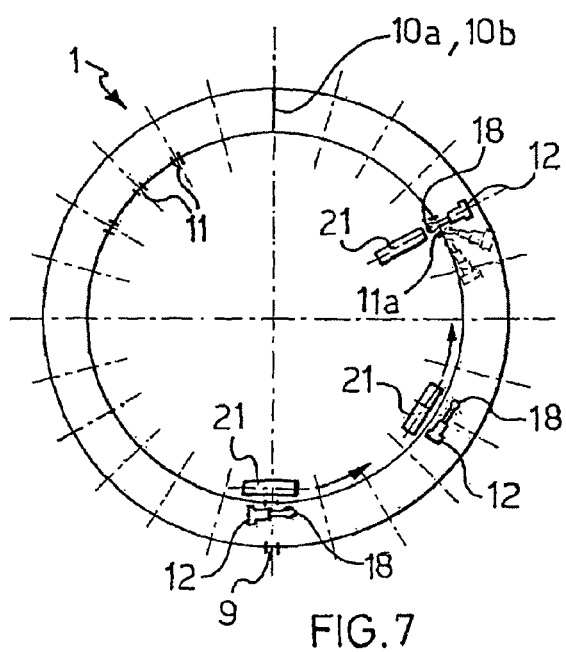
Figure 8:
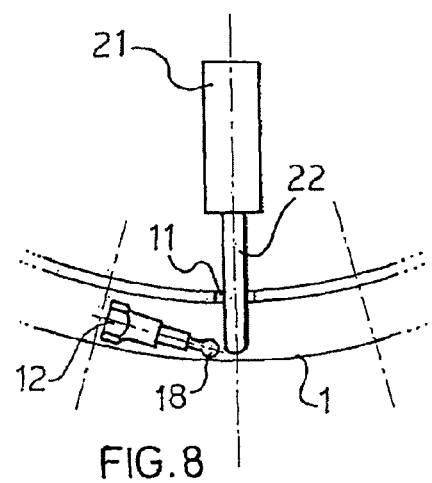
Figure 9:
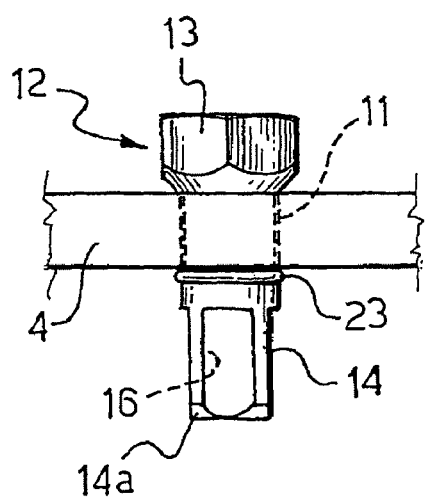
Figure 10:
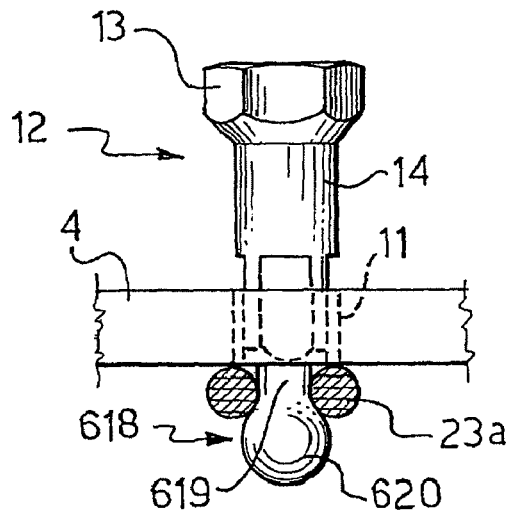
Figure 11:
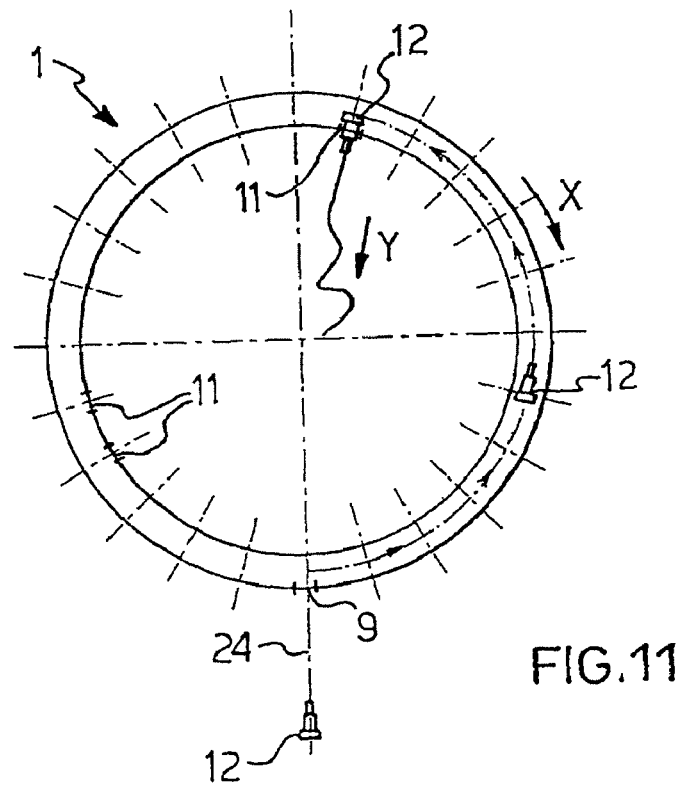
Figure 12:
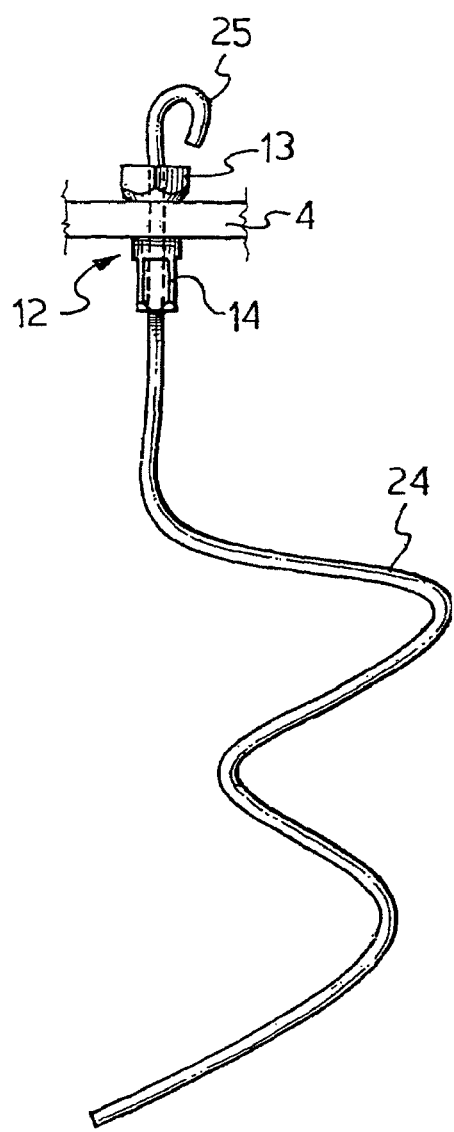
Figure 13:
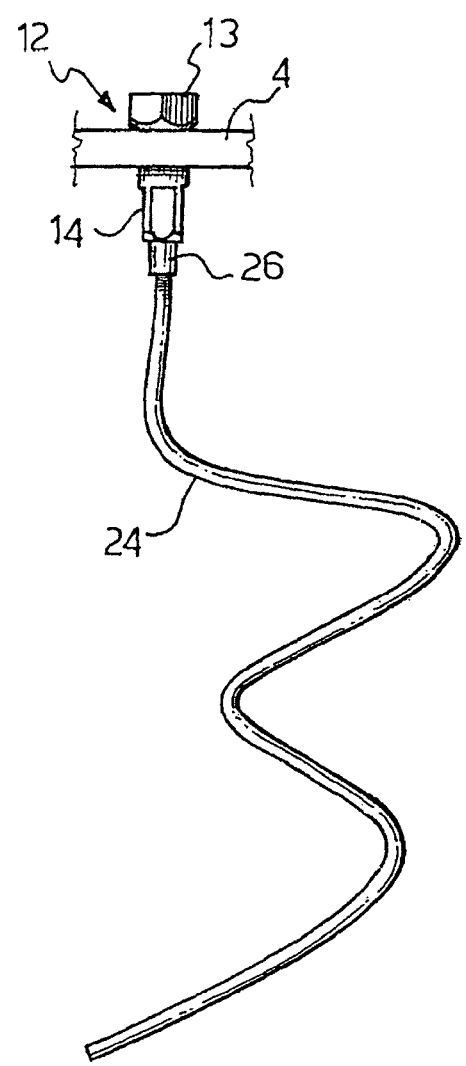
Figure 14:
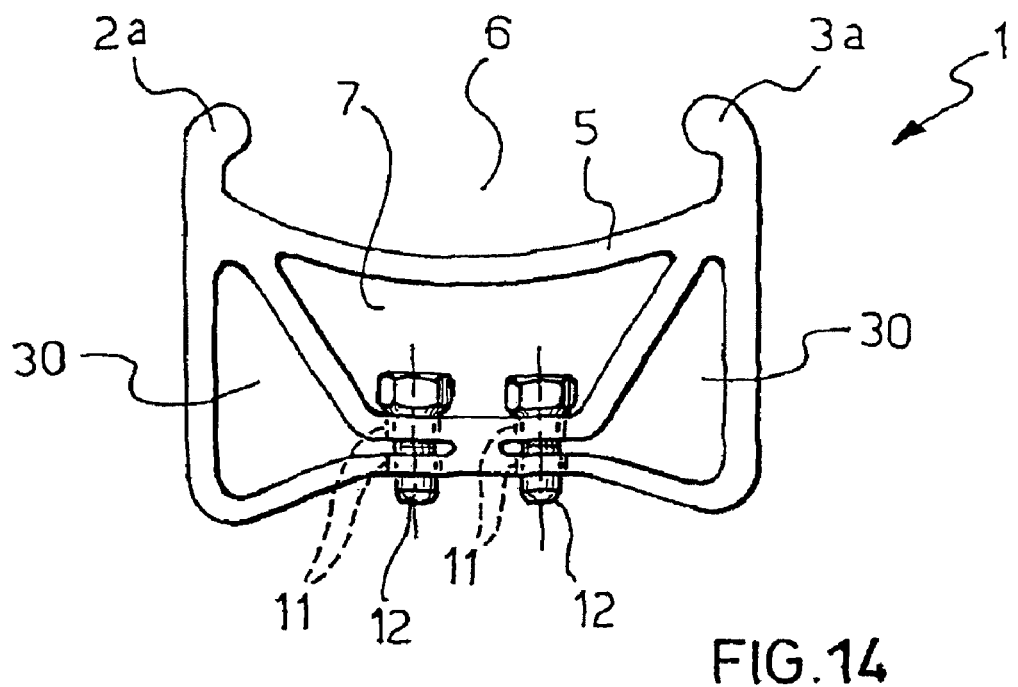
Figure 15:
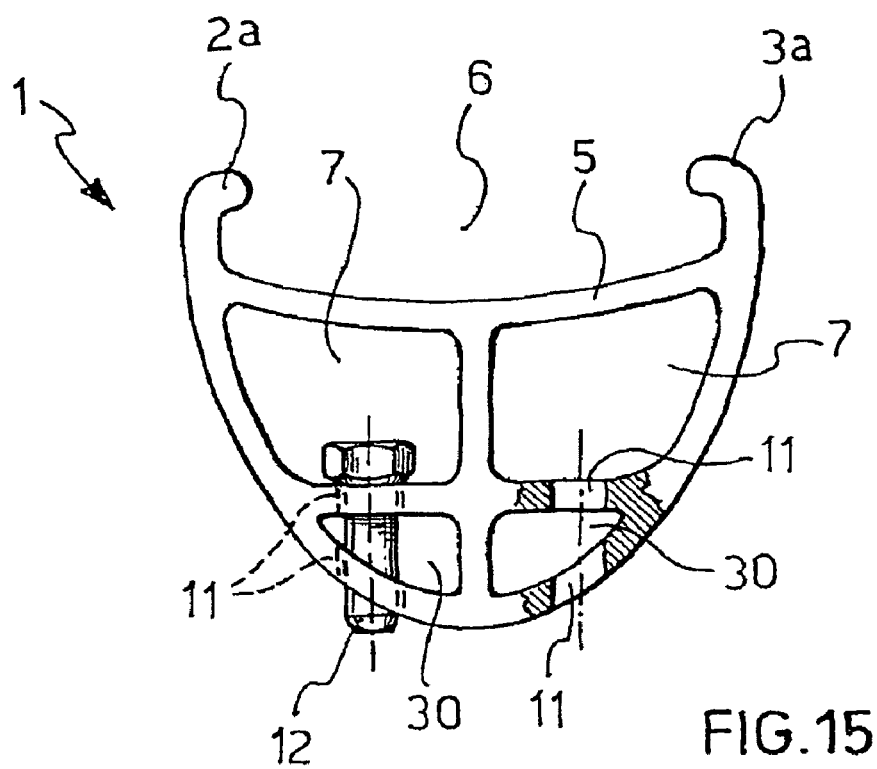

Further characteristics and advantages of the present invention shall become clearer from the following detailed description of some of its preferred embodiments, given with reference to the attached drawings. In the drawings:

FIG. 1 illustrates, schematically and partially cut-away, a spoked wheel for a bicycle according to the present invention, FIGS. 2 to 4 schematically illustrate some types of spokes and respective spoke attachment elements and seats in the hub of a wheel, FIGS. 5 and 6 schematically illustrate two embodiments of a spoke attachment element with an insert capable of being attracted by a magnetic field according to the invention, FIGS. 7 and 8 schematically illustrate an embodiment of the process according to the invention, FIGS. 9 and 10 schematically illustrate a spoke attachment element held to a rim of a wheel according to the invention, FIGS. 11-13 schematically illustrate another embodiment of the process according to the invention, and FIGS. 14 and 15 schematically illustrate alternative sections of a rim of a bicycle spoked wheel according to the invention.

DETAILED DESCRIPTION OF THE PREFERRED EMBODIMENTS

In FIG. 1 a portion of a rim 1 of a bicycle spoked wheel, particularly suitable for use with a tubeless tire, is schematically illustrated in a perspective view.

The rim 1 consists of a profiled bar, usually obtained by extrusion of steel or aluminum and its alloys or magnesium and its alloys, or else it is made of carbon fiber by casting, or obtained in other, per se, known ways.

The rim 1 is formed by two side walls 2, 3 connected or filleted at one end by a circumferentially internal wall or lower bridge 4 and connected at an intermediate point by a circumferentially external wall or upper bridge or partition 5, so as to have a substantially inverted A-shaped cross-section.

The circumferentially external portions 2a, 3a of the side walls, or fins 2a, 3a, typically provided with a border 2b, 3b, form a tire coupling channel 6 with the upper bridge or partition 5. More specifically, the tire, not illustrated for the sake of clarity, is coupled in the tire coupling channel 6 by inserting the beads into the fins 2a, 3a, the borders acting to hold the beads in a, per se, known way.

The circumferentially internal portions 2c, 3c of the side walls 2, 3 form, with the lower bridge 4 and the upper bridge 5, an attachment chamber 7 for spokes 8, in the way described hereafter.

Under references 9 and 9a, a pair of holes is illustrated, provided for housing an inflation valve (not shown) of the tire, formed essentially coaxially in the upper bridge 5 and in the lower bridge 4.

The fins 2a, 3a are subject to geometric and size restrictions both for the need to attach the tire and for the need to provide, externally, a suitable sliding surface for the brake pads. The partition wall 5 or upper bridge is subject to the restriction, in the case of a tubeless tire, of creating an airtight seal with the tire and therefore of having just the hole 9 for the valve. For tires with inner tube, of course, such a restriction does not exist.

On the other hand, the remaining walls 2c, 3c, 4 of the spoke attachment chamber 7 are not subject to geometric or size restrictions and can therefore be replaced by a single wall with an arc of circle cross-section, by two walls arranged in a V-shape, or by more walls so as to form a section with a shape more complex than the one illustrated, possibly defining many spoke attachment chambers 7, as shall be illustrated hereafter by way of an example with reference to FIGS. 14 and 15.

The particular section illustrated in FIG. 1 and the following Figures, therefore has the purpose of merely illustrating and not limiting the present invention.

In the case of a profiled bar obtained by extrusion, the ends 10a, 10b of the profiled bar, after a calendaring step for shaping into a circle, are joined closing the profiled bar upon itself, typically by welding, for example flash welding or TIG welding, by cementing after insertion in the spoke attachment chamber 7 of a sleeve (not shown), typically made of aluminum, or by pin-connection. It should be noted that, for use with tubeless tires, it is important that the jointed section is also airtight.

In the case of a rim 1 obtained by carbon fiber casting, of course the calendaring and jointing steps are not necessary.

The holes 9, 9a for the valve can be arranged along the profiled bar embodying the rim 1 in any position, but preferably unlike as illustrated in FIG. 1 for the sake of clarity, roughly diametrically opposite the jointing of the ends 10a, 10b.

The spoke attachment chamber 7 is provided with a plurality of spoke attachment seats 11. The spoke attachment seats 11 are illustrated as formed in the circumferentially internal wall or lower bridge 4 of the spoke attachment chamber 7, but they can also be formed in one or both of the circumferentially internal portions 2c, 3c of the side walls 2, 3 of the profiled bar, as illustrated by way of an example by the seat 11a (although seats 11 and 11a are shown, it should be recognized that either one or the other location of the seats, but usually not both, would be used in manufacturing the rim).

Moreover, while in FIG. 1 and the following Figures it is illustrated a single series of spoke attachment seats 11 uniformly distributed along the middle plane of the rim 1, the number and distribution of the spoke attachment seats 11 can be highly different. For example, the seats 11 could be grouped together in groups of two, three or four and/or could be formed on many planes, different from the middle plane of the rim 1.

The spoke attachment seats 11 shown in the Figures are simple non-threaded holes. These non-threaded holes, however, are not the only kind of holes that can be used. Internal threading of the holes embodying the seats 11 may be provided, or riveting can be used to strengthen the seats 11, so long as they have an inner diameter greater than the maximum dimension of the shank of the spoke attachment elements 12. Moreover, it is not even necessary that the holes 11 be circular-shaped. They can be of any shape, so long as they are suitable to house the shank of the spoke attachment elements 12 making it partially protrude from the spoke attachment chamber 7.

The formation of non-threaded holes for the seats 11 is much simpler than the formation of threaded holes by material deformation. Moreover, while the presence of the "chimney" resulting from such a type of manufacture makes it impracticable to calendar the profiled bar to shape it as a circle after the formation of the threaded holes, non-threaded holes do not have such a drawback. Moreover, the formation of non-threaded holes lends itself particularly well to carbon fiber rims 1.

Each spoke attachment seat 11 is indeed intended to receive a spoke attachment element 12, comprising a head 13 of such a shape and size, with respect to the spoke attachment seats 11, as to be held inside the spoke attachment chamber 7, a shank 14 suitable for extending through a spoke attachment seat 11 and means for the attachment of the spoke, more specifically for the attachment of a first end of a spoke 8, the second end of the spoke 8 being attached to a hub 15 in the way described hereafter with reference to FIGS. 2-4.

Preferably, the end of the shank 14 far from the head 13 is beveled as indicated by 14a to ease its insertion in the spoke attachment seat 11.

Depending on the means for the spoke attachment, the spoke attachment element 12 can allow the tension adjustment of the spoke 8 ("nipple") or not ("barrel"). A spoke attachment element 12 of the barrel type can be as illustrated in FIG. 2, wherein the means for the attachment of a spoke comprise a threaded hole 216 in which a threaded end 281 of a spoke 28 is completely screwed in. To allow the tension adjustment of the spoke 28, the second end 282 of the spoke 28 is preferably also threaded and the hub 215 is provided with a threaded hole 2151 of such a length as to allow the screwing-in to different depths of the second end 282 of the spoke 28. The threaded hole 2151 can be formed directly in the hub 215 or in an intermediate element analogous to a nipple or barrel. In FIG. 2, the barrel is indicated with reference 212, its head with reference 213, its shank with reference 214 and the bevel of the free end of the shank 214 with 214a.

Alternatively, a spoke attachment element 12 of the barrel type can be as illustrated in FIG. 3, wherein the means for the attachment of a spoke comprise a through-hole 316 with a non-circular section, for example rectangular, and a seat 317 of the same shape, but rotated with respect to the through-hole 316, so as to create a bayonet coupling with a head 381 at the end of the spoke 38. The second end 382 of the spoke 38 is, analogously to the case of FIG. 2, preferably threaded and the hub 315 is provided with a threaded hole 3151 of such a length as to allow the screwing-in to different depths of the second end 382 of the spoke 38. Also in this case, the threaded hole 3151 can be formed in an intermediate element analogous to a nipple or barrel. In FIG. 3, the barrel is indicated with reference 312, its head with reference 313, its shank and the relative bevel with references 314, 314a.

A spoke attachment element 12 of the nipple type can be as illustrated in FIG. 4, wherein the means for the attachment of a spoke comprise a threaded through-hole 416, of such a length as to allow the screwing-in to different depths of a first threaded end 482 of the spoke 48, to thus allow the tension adjustment of the spoke 48. The second end of the spoke 48 can thus be provided with a head 482 suitable for being attached to a hub 415 inserting into a seat 4151 thereof. In FIG. 4, the nipple is indicated with reference 412, its head with reference 413, its shank and the relative bevel with references 414,414a.

In the following part of the present description and in the later described Figures, for the sake of brevity reference shall mainly be made to spoke attachment elements 12 of the nipple type, but they can always be replaced by barrels of the type of barrel 212 or of barrel 312.

In whatever embodiment of the spoke attachment elements 12, their head 13, as previously discussed, engages with the spoke attachment seat 11 to counteract the traction force exerted on the spoke 8.

To allow the insertion of the spoke attachment elements 12 in the spoke attachment seats 11, according to the process of the invention it is provided to insert the spoke attachment elements 12 in the spoke attachment seats 11 from the inside of the spoke attachment chamber 7.

More specifically, the spoke attachment elements 12 are inserted in the chamber 7, one or more at a time, through a suitably sized opening, which for tubeless tires must also be such as not to jeopardize the airtight seal of the tire coupling channel 6. The spoke attachment elements 12 are then guided from the opening up to a respective spoke attachment seat 11, aligned with such a spoke attachment seat 11 so as to allow access (immediate or subsequent) of the end of a spoke 8 to their means for the attachment of a spoke, and thus held.

The holding of each spoke attachment element 12 aligned with a spoke attachment seat 11 can occur through suitable holding means described hereafter or through the attachment of a first end of a spoke 8 to the means for the attachment of a spoke of the spoke attachment element 12, for example by screwing the spoke 28, 48 into the barrel 212 of FIG. 2 or into the nipple 412 of FIG. 4, or by engaging the head 381 of the spoke 38 in the barrel 312 of FIG. 3.

In the case of holding through attachment of the spoke 8, the length and the relative stiffness of the spoke 8 prevent the return of the spoke attachment element 12 into the spoke attachment chamber 7, independently of whether the opposite end of the spoke is already constrained to the hub 15 of the wheel or else it is constrained to it immediately after or in a subsequent manufacture step.

The opening of the spoke attachment chamber 7 through which the spoke attachment elements 12 are inserted can be chosen from amongst different alternatives. In the case in which it is desired to obtain a bicycle spoked wheel which is suitable for use with a tubeless type tire, the requirement following which the tire coupling channel 6 remains airtight must be satisfied. More generally, the preservation of a suitable stiffness of the rim 1 without unduly increasing its weight must be satisfied.

A first possibility, that may be actuated in the case of rims 1 made by extrusion, is that of exploiting, as an opening for the insertion of the spoke attachment elements 12, the open section of the spoke attachment chamber 7 at one of the ends 10a, 10b of the profiled bar, before it is closed upon itself through the jointing described above, or even before it is calendared or otherwise shaped as a rim.

A second possibility, that may be actuated also in the case of a rim 1 cast in carbon fiber, is that of exploiting one of the holes 9, 9a for the inflation valve of the tire. According to ETRTO (European Tire and Rim Technical Organization) specifications and ISO norms, the hole for the valve must have a diameter of 6.2 mm with a tolerance of ±0.3 mm (in other words a diameter between 5.9 and 6.5 mm), whereas the head 13 of the spoke attachment elements 12 is normally circular with a diameter of 6 mm or hexagonal inscribable in a circumference with a diameter of 6 mm. It should be noted that such specifications are relative to the single hole for the valve of the rims without the partition wall 5, whereas the double holes for the valve, necessary for the rims provided with the partition wall 5, have not been ruled yet.

According to the invention, a diameter between 6 and 9 mm is chosen for at least one of the holes 9, 9a for the inflation valve of the tire. Preferably, a diameter between 6 and 6.5 mm is chosen for the hole 9a in the lower bridge 4, more preferably a diameter of 6.5 mm; the hole 9 in the upper bridge 5 is preferably formed with a diameter between 6 and 9 mm, more preferably a diameter of 8 mm, especially in the case of rims with inner tube. Such a size of the hole 9 allows a better housing of the attachment of the valve of the inner tube, which has a widening. Through one or both such holes 9, 9a it is, indeed, possible to insert the spoke attachment elements 12 in the spoke attachment chamber 7.

The shank 14 of the spoke attachment elements 12 has an outer diameter of 3.9 mm, so that the spoke attachment seats 11 can have a diameter between 4 and 4.5 mm, preferably of 4.2 mm. The diameter of the spokes 8 (or for non-circular spokes, the maximum dimension) can be between 1.8 and 2.3 mm, and preferably of 2 mm.

Both these solutions can be advantageous since they do not require any additional holes to be made in the rim 1, neither towards the tire coupling channel 6, which is therefore also suitable for the mounting of a tubeless tire, nor in the remaining wall of the spoke attachment chamber 7. Moreover, when in all of the spoke attachment seats 11 a respective spoke attachment element 12 has been inserted, the spoke attachment chamber 7 is also essentially closed towards the outside, thus offering a particularly aerodynamic surface which is substantially impenetrable by water, dirt, dust and small stones which could oxidize or damage the rim 1 or the spoke attachment elements 12.

In the case of a rim 1 obtained by extrusion, the spoke attachment elements 12 can be inserted in the spoke attachment chamber 7 through one of the holes 9, 9a for the valve before or after the calendaring step or different manufacture step for shaping the profiled bar into a circle, and before or after the step of jointing its ends 10a, 10b.

When one of the holes 9, 9a for the valve is used as an opening for the insertion of the spoke attachment elements 12, it is particularly advantageous that they be diametrically opposite the jointing between the two ends 10a, 10b of the extruded profiled bar embodying the rim 1. Indeed, at such a jointing the cross-section of the spoke attachment chamber 7 can be slightly obstructed or even completely obstructed in the case of jointing by welding or cementing. If the holes 9, 9a for the valve are diametrically opposite the jointing section, the path that the spoke attachment elements 12 must take inside the spoke attachment chamber 7 is, at most, equal to half the length of the chamber 7 itself, i.e. half the circumference.

A third possibility is that of providing a dedicated opening 27 in the spoke attachment chamber 7 (see FIG. 1), or even more than one, but still less in number with respect to the number of seats 11, so as not to jeopardize the optimization of the structural stiffness and of the weight of the rim 1.

This possibility can be advantageous to allow the replacement of a broken or damaged spoke attachment element, without having to disassemble and reassemble the inflation valve of the tire.

Such a dedicated opening 27 is preferably provided with a removable cover 29.

In the case of a tubeless tire, the dedicated opening(s) 27 shall be formed in one of the walls 2c, 3c, 4 other than the partition wall 5 with the tire coupling channel 6 to preserve its airtight seal.

On the other hand, in the case of a tire with inner tube, the dedicated opening(s) 27 shall preferably be formed in the partition wall 5, so that the spoke attachment chamber 7, in the assembled state of the bicycle wheel, is as far as possible closed towards the outside.

The spoke attachment elements 12 can be guided up to the respective spoke attachment seats 11, aligned with them and held there according to different embodiments of the process according to the invention, described hereafter.

A first embodiment of the process according to the invention provides for exploiting magnetic interaction for the transportation of the spoke attachment elements 12 along the spoke attachment chamber 7. This can, for example, be carried out by making the spoke attachment element 12 at least partially capable of being attracted by a magnetic field before inserting it into the spoke attachment chamber 7, and then attracting the spoke attachment element 12 through a magnetic field up to the spoke attachment seat 11.

To make the spoke attachment element 12 at least partially capable of being attracted by a magnetic field, it can, for example, be made of steel.

In a preferred alternative, the spoke attachment element 12 can be made of aluminum or brass as usually, but provided with an insert which makes the end of the shank 14 of the spoke attachment element 12 opposite its head 13 capable of being attracted by a magnetic field. This promotes the correct orientation of the spoke attachment element 12 in the spoke attachment seat 11.

FIG. 5 illustrates by way of an example a bush-like insert 518 capable of being attracted by a magnetic field extending in the shank 14 of a nipple type spoke attachment element 12, about the threaded hole 16 of the nipple 12. More specifically, the insert 518 capable of being attracted by a magnetic field is illustrated extending for a certain length of the shank 14 starting from the end of the shank 14 far from the head 13 of the nipple, in other words from the end intended to be inserted in the spoke attachment seat 11. The insert 518 is therefore irremovably associated with the spoke attachment element or nipple 12.

An alternative which is even more advantageous and cost effective, since it does not require forming a suitable groove in the shank 14 of each spoke attachment element 12 and it allows the insert capable of being attracted by a magnetic field to be reused for different spoke attachment elements 12, provides for the use of such an insert removably inserted in the spoke attachment element 12 through its means for the attachment of a spoke, for example screwed into the hole of a nipple 12.

Such an insert can be a portion of a spoke 8, or else a suitable insert, such as insert 618 illustrated in FIG. 6. The insert 618 comprises a shank 619 externally threaded to be screwed into the threaded hole of the nipple or barrel 12. In the case of a bayonet barrel, the suitable insert shall, of course, provide for a suitably shaped head.

The insert 618 also comprises, at its free end, a rounded or else beveled head 620, to ease insertion in a spoke attachment seat 11.

The spoke attachment element 12, made to be capable of being attracted by a magnetic field in one of the aforementioned ways, can be attracted directly from the opening of the spoke attachment chamber 7 from which it was inserted through a magnetic field at the preselected spoke attachment seat 11.

Alternatively, the spoke attachment element 12 can be guided from such an opening up to the spoke attachment seat 11 through a relative movement of the magnetic field and of the rim 1.

To obtain this, in an embodiment of the process, the magnetic field can be generated by an electromagnetic circuit in a fixed position, by rotating (after calendaring or casting) or by translating (before calendaring, in the case of an extruded rim 1) the rim 1 at the magnetic field, or else by an electromagnetic circuit which is movable, in particular capable of translating or rotating.

Alternatively, a small magnet can be used, moved by hand or automatically along the path from the opening to the preselected spoke attachment seat 11, as schematized in FIG. 7, where different positions of a magnet 21 and of a spoke attachment element 12 with an associated insert capable of being attracted by a magnetic field are illustrated, along the rim 1 from the hole 9 for the valve to a preselected spoke attachment seat 11. It is preferable to install the nipples starting from the farthest one from the inlet openings. The path along which the spoke attachment element 12 is guided by the magnetic field shall preferably extend along a wall of the spoke attachment chamber 7 other than the one carrying the spoke attachment seats 11, to avoid interference with the spoke attachment elements 12 already aligned with the other spoke attachment seats 11.

Particularly advantageously and as illustrated in FIG. 8, the magnet 21 can have an elongated end 22, of a size such as to insert into the spoke attachment seats 11. By inserting the end 22 of the magnet 21 in the preselected seat 11, the spoke attachment element 12 guided close to such a seat 11 can be "fished" from the inside of the spoke attachment chamber 7.

When, in particular, the spoke attachment element 12 is provided with an insert 18 which makes the end of the shank 14, far from the head 13, capable of being attracted by a magnetic field, the elongated end 22 of the magnet 21 shall "fish" such an end, attracting the spoke attachment element 12 correctly aligned with the spoke attachment seat 11.

In another alternative, the spoke attachment element 12 or an insert thereof such as insert 518 or insert 618 can be made as a permanent magnet, using for transportation along the spoke attachment chamber 7 a second magnet such as magnet 21 or else an element capable of being attracted by a magnetic field, for example a piece of iron or steel, preferably shaped like the magnet 21.

Once the spoke attachment element 12 is aligned with the preselected spoke attachment seat 11, it is held in such a position. Different ways for holding the spoke attachment element 12 in position are envisaged.

If, in the manufacturing process, it is desired to directly make the bicycle spoked wheel, the shank 14 of the spoke attachment element 12 can be drawn out from the spoke attachment seat 11 and, temporarily holding it with the fingers or with a gripping tool, a spoke 8 can be attached thereto, for example by screwing it into a threaded hole 16 thereof. Of course, in the case in which the spoke attachment element 12 is provided with an insert capable of being attracted by a magnetic field associated with its means for the attachment of a spoke, such as insert 618 of FIG. 6, the insert 618 shall previously be removed from the spoke attachment element 12.

The spoke 8 can already be constrained, at its opposite end, to a hub 15, it can immediately afterwards be constrained to the hub 15 or else it can be left free at the second end. It must be noted that, also in the latter case, the spoke attachment element 12 is held aligned with the spoke attachment seat 11 since the length and relative stiffness of the spoke 8 prevent the return of the spoke attachment element 12 into the spoke attachment chamber 7.

If, on the other hand, in the manufacturing process it is desired to defer the manufacture of the wheel, even if it is only desired to align all of the spoke attachment elements 12 with the respective spoke attachment seats 11 before assembling the spokes 8, the spoke attachment element 12 can be otherwise held aligned with the respective spoke attachment seat 11.

This can be obtained by associating an element of a larger size than the spoke attachment seat 11 with the spoke attachment element 12, from the outside of the spoke attachment chamber 7.

For example, in FIG. 9 a spoke attachment element 12 is illustrated held through an elastic ring 23, a clamp or another device, arranged about its shank 14, after having possibly removed the insert 18, capable of being attracted by a magnetic field, from its means for the attachment of a spoke. The elastic ring 23 shall preferably be removed after the attachment of a spoke 8 to the spoke attachment element 12.

Alternatively, when the spoke attachment element 12 is provided with an insert 618 capable of being attracted by a magnetic field of the type illustrated in FIG. 6, it can be held aligned with the spoke attachment seat 11 through an elastic ring 23a, a clamp or another device, arranged about the shank 619 of the insert 618, as illustrated in FIG. 10.

In a further alternative which is not shown, the spoke attachment element 12 can be held aligned with the spoke attachment seat 11 by coupling with its means for the attachment of a spoke (after having possibly removed the insert 18 capable of being attracted by a magnetic field) an insert provided with a shank and a head, analogous to the insert 618 capable of being attracted by a magnetic field, but having a head larger in size than the spoke attachment seat 11.

As an alternative or in addition to the use of the magnetic interaction to guide the spoke attachment elements 12 to a respective spoke attachment seat 11, the rim 1, already calendared and in which one or more spoke attachment elements 12, possibly provided with a respective insert 18 capable of being attracted by a magnetic field, has or have been inserted from the preselected opening, can be kept in a vertical plane and rotated in an angular position such that a preselected spoke attachment seat 11 is from time to time in the lowest position (at "6 o'clock").

In such a way the force of gravity is exploited to automatically guide the spoke attachment element 12 up to the preselected spoke attachment seat 11.

The spoke attachment element 12 can then be "fished" through the elongated end 22 of the magnet 21, or simply attracted by a magnetic field outside of the spoke attachment chamber 7. Further possibilities for aligning the spoke attachment element 12 with the spoke attachment seat 11 are described later on.

To further promote the action of the force of gravity and/or to free a spoke attachment element 12 which became stuck along the rim 1, especially when many spoke attachment elements 12 are already in position in respective spoke attachment seats 11, the aforementioned rotary movement can be accompanied by a vibratory movement of the rim 1.

Such a vibratory movement of the rim 1 can, moreover, also be provided for with the rim 1 arranged in any plane and independently of the aforementioned rotary movement, again to free a spoke attachment element 12 which became stuck along the rim 1.

As a further alternative or in addition to the use of a magnetic field to guide the spoke attachment elements 12 to a respective spoke attachment seat 11, a stream of fluid can also be generated along the spoke attachment chamber 7, for example a stream of suction air or a stream of pressurized air or water, between the preselected opening and the or each spoke attachment seat 11.

In a further embodiment of the process according to the invention, to guide and align a spoke attachment element 12 with a preselected spoke attachment seat 11 a semi-rigid cable can be used, in other words a cable which is sufficiently flexible to follow the progression of the spoke attachment chamber 7, in particular when the rim 1 has already been calendared or it is cast, but sufficiently rigid to be able to be pushed along the spoke attachment chamber 7.

A suitable semi-rigid cable is, for example, a steel cable, of the type in use for the controls of the gear-change device for a bicycle.

Such an embodiment of the process of the present invention provides, as shown schematically in FIG. 11, for extending the semi-rigid cable 24 in the spoke attachment chamber 7 between the preselected spoke attachment seat 11 and the preselected opening for the entry of the spoke attachment elements 12, for example one of the holes 9, 9a for the valve or one of the ends 10a, 10b of the profiled bar embodying the rim 1.

A spoke attachment element 12 is constrained to the semi-rigid cable 24 so that the spoke attachment element 12 is prevented from sliding along the semi-rigid cable in direction X from the spoke attachment seat 11 to the preselected opening.

The semi-rigid cable 24 is then pulled in direction Y opposite direction X, in other words it is pulled from the spoke attachment seat 11, dragging the spoke attachment element 12 therewith.

Once the spoke attachment element 12 is aligned with the preselected spoke attachment seat 11, the semi-rigid cable 24 is released from the spoke attachment element 12 and drawn out from the spoke attachment chamber 7 and the spoke attachment element 12 is held in one of the various ways described above with reference to the magnetic field embodiment.

As will easily be understood, it is possible to extend the semi-rigid cable 24 in the spoke attachment chamber 7 before constraining the spoke attachment element 12 to it or afterwards.

In the first case, the semi-rigid cable 24 shall preferably be extended in the chamber 7 inserting one end thereof from the spoke attachment seat 11 and drawing it out from the preselected opening, since the opening is necessarily larger in size than the spoke attachment seat 11 and it is thus easier to draw out the end of the semi-rigid cable 24.

In the second case, the semi-rigid cable 24 shall necessarily be extended in the chamber 7 inserting one end thereof from the preselected opening, and drawing it out from the spoke attachment seat 11.

Various possibilities exist for constraining the semi-rigid cable 24 to the spoke attachment element 12.

A first possibility is that, as illustrated in FIG. 12, of threading the semi-rigid cable 24 in a through-hole of the spoke attachment element 12, in particular in the threaded hole or hole with a non-circular section embodying the means for the attachment of a spoke (hole 316, 416 of FIGS. 3 and 4), and blocking the sliding of the spoke attachment element 12 along the semi-rigid cable 24 in direction X by bending one end of the semi-rigid cable 24 upon itself on the side at the head 13 of the spoke attachment element 12, as illustrated in FIG. 12.

Once the spoke attachment element 12 is correctly positioned in the spoke attachment seat 11, as illustrated in FIG. 12, a greater traction in direction Y will allow straightening the bend 25 and drawing out the semi-rigid cable 24 from the spoke attachment element 12.

A second possibility is that, as illustrated in FIG. 13, of providing a terminal 26 integral with one end of the semi-rigid cable 24 and provided with attachment means suitable for the means for the attachment of a spoke of the spoke attachment element 12, for example an externally threaded terminal suitable for being screwed into the threaded hole 216, 416 of a nipple or barrel according to FIGS. 2 and 4, or provided with a head suitable for bayonet coupling in the barrel 312 of FIG. 3.

Once the spoke attachment element 12 is correctly positioned in the spoke attachment seat 11, as illustrated in FIG. 13, holding its shank 14, for example with the fingers or through a gripper, it shall be possible to release the terminal 26 of the semi-rigid cable 24 from the spoke attachment element 12, drawing out the semi-rigid cable 24 in direction Y.

A further alternative (not illustrated) is that of threading the semi-rigid cable 24 in a through-hole of the spoke attachment element 12 and blocking the sliding of the spoke attachment element 12 along the semi-rigid cable 24 in direction X by widening the section of the semi-rigid cable 24 at an intermediate point thereof, adjacent to the head 13 of the spoke attachment element 12, for example by associating a clamp with the semi-rigid cable 24 or by making a knot along the semi-rigid cable 24.

Once the spoke attachment element 12 is correctly positioned in the spoke attachment seat 11, the semi-rigid cable 24 shall be recovered pulling it in direction X from the preselected opening, so that it slides in the through-hole of the spoke attachment element 12 and along the spoke attachment chamber 7.

To ease the guiding along the spoke attachment chamber of the semi-rigid cable 24, or of the various semi-rigid cables 24 in the case of the contextual assembly of more than one spoke attachment element 12, or the drawing out of the semi-rigid cable(s) 24, a stream of fluid can also be generated along the spoke attachment chamber 7, for example a stream of suction air or a stream of pressurized air or water, in direction X or in direction Y, according to the step which it is desired to ease.

It will be understood that in the various embodiments indicated above, the spoke attachment elements 12 can be inserted in the spoke attachment chamber 7, guided up to the respective spoke attachment seats 11 and aligned with the seats 11 individually, in groups or all together.

In FIGS. 14 and 15 two alternative sections of a rim 1 for a bicycle spoked wheel according to the invention are schematically illustrated, exemplifying more complex sections that such a rim can take.

Thus, in the rim 1 of FIG. 14, under the spoke attachment chamber 7 two additional chambers 30 can be distinguished, formed through further walls which contribute to giving strength to the bicycle rim 1. The spoke attachment seats 11, intended to receive and hold the spoke attachment elements 12, each comprise two holes, one in the wall of the spoke attachment chamber 7 and the other in the circumferentially innermost wall of the rim 1. The additional chambers 30 are narrowed at the spoke attachment seats 11.

In the rim 1 of FIG. 15 two spoke attachment chambers 7 and two additional chambers 30 can be distinguished, so that also in this embodiment the spoke attachment seats 11 each comprise two holes.

Although in both FIGS. 14 and 15 two spoke attachment elements 12 are illustrated in a same cross-section, this is not absolutely necessary, indeed the spoke attachment elements 12 may be distributed along the circumference of the rim 1 in the various ways described above.

From the previous description it shall become clear that besides the manufacturing process for a bicycle spoked wheel, the present invention provides a rim for a bicycle spoked wheel which is particularly advantageous since it is easy to manufacture, lighter the structural strength being equal, less subject to the entry of dirt and easy to be adapted to a tubeless tire.

The various intermediate products obtained in the carrying out of the process of the invention can also be marketed, so that some of the attached claims are directed to such intermediate products.

Finally, it can be understood that the rim 1 (or even a completely assembled wheel) according to one of the embodiments exploiting magnetic interaction for transporting the spoke attachment elements 12 along the spoke attachment chamber 7 can be accompanied by a kit of spare parts, comprising one or more spoke attachment elements 12 capable of being attracted by a magnetic field or made magnetic, totally or through an insert 518 or 618, one or more spokes 8 and a magnetic element or an element capable of being attracted by a magnetic field such as the aforementioned element 21, in particular having the elongated end 22 suitable for inserting in the spoke attachment seats 11.

What is claimed is:

1. A method for use in manufacturing a spoked bicycle wheel, comprising the steps of:
   a) providing a rim element comprising:
      i) a tire coupling channel; and
      ii) at least one spoke attachment chamber with at least one opening, a plurality of spoke attachment seats, an inside area within the chamber, and an outside area outside the chamber;
   b) inserting a spoke attachment element inside the at least one spoke attachment chamber through the at least one opening, the spoke attachment element comprising:
      i) a head;
      ii) a shank suitable for extending through and protruding from the spoke attachment seat; and
      iii) means for attaching the spoke attachment element to a spoke;
   c) guiding the spoke attachment element along a circumferential direction of the at least one spoke attachment chamber to the spoke attachment seat;
   d) aligning the shank of the spoke attachment element with the spoke attachment seat; and
   e) holding the spoke attachment element aligned with the spoke attachment seat.

2. The method of claim 1 further comprising the step:
   f) providing the spoke attachment element with a first magnetic interaction means, step f) being carried out before step b); and
   wherein said step c) comprises:
   g) attracting the spoke attachment element using a second magnetic interaction means interacting magnetically with the first magnetic interaction means.

3. The method of claim 2 further comprising the step:
   h) moving the spoke attachment element inside the at least one spoke attachment chamber from the at least one opening to the spoke attachment seat by moving the second magnetic interaction means and the at least one spoke attachment chamber with respect to each other.

4. The method of claim 2 wherein the first magnetic interaction means of the spoke attachment element is at the end of a shank opposite the head.

5. The method of claim 2 wherein in step g), the second magnetic interaction means comprises an element with one end that magnetically interacts with the first magnetic interaction means inside the at least one spoke attachment chamber.

6. The method of claim 1 further comprising the step:
   q) shaping the rim element into a circle.

7. The method of claim 6 further comprising the step:
   r) attaching a first end of the rim element to a second end of the rim element, wherein the at least one opening comprises the ends of the rim element.

8. The method of claim 7 wherein the first end and second end are attached to each other by welding.

9. The method of claim 7 wherein the first end and second end are attached to each other by cementing.

10. The method of claim 1 wherein the at least one opening comprises at least one dedicated opening through which the attachment element can pass.

11. The method of claim 10 wherein the dedicated opening has a removable cover.

12. The method of claim 10 wherein the at least one dedicated opening is formed in a portion of the wall of the at least one spoke attachment chamber other than a partition wall between the tire coupling channel and the at least one spoke attachment chamber.

13. The method of claim 10 wherein the at least one dedicated opening is formed in a partition wall between the tire coupling channel and the at least one spoke attachment chamber.

14. The method of claim 1 wherein the holding step e) comprises attaching a first end of a spoke to the means for attaching.

15. The method of claim 1 wherein the holding step e) comprises attaching a retaining member to the spoke attachment element from the outside of the at least one spoke attachment chamber.

16. The method of claims 1 further comprising the step:
   f1) providing the spoke attachment element with a first magnetic interaction means, step f) being carried out before step b); and
   wherein step d) comprises
   g1) attracting the spoke attachment element using a second magnetic interaction means interacting magnetically with the first magnetic interaction means.

17. The method of claim 1 wherein the rim element is circular shaped and the guiding step c) includes arranging the circle-shaped rim element in a vertical plane and orientating it in an angular position wherein the spoke attachment seat is in the lowest position.

18. The method of claim 1 wherein the guiding step c) comprises shaking the rim element.

19. The method of claim 1 further comprising the step:
   n) generating a stream of fluid inside the at least one spoke attachment chamber.

20. The method claim 1 wherein the at least one opening comprises at least one hole provided for housing an inflation valve for a tire.

21. The method of claim 1 wherein the inserting step b), guiding step c) and aligning step d) are sequentially carried out for a preselected spoke attachment seat.

22. The method of claim 1 wherein the inserting step b) is carried out for at least two of the spoke attachment seats before carrying out guiding step c) and aligning step d) for at least one of the spoke attachment seats.

23. The method of claim 1 wherein the means for the attaching is an internally threaded hole.

24. The method of claims 1 wherein the means for the attaching is a bayonet coupling.

25. The method of claim 1 further comprising step:
   p) forming the spoke attachment seats in the rim element as non-threaded holes.

26. The method of claim 1 wherein the shank has a bevel thereon.

27. The method of claim 1 further comprising the step:
s) inserting a sleeve into the rim element.

28. The method of claim 1 wherein the rim is formed from carbon fiber.

29. The method of claim 1 wherein the rim is formed from a profiled bar.

30. The method of claim 1 wherein the spoke attachment seats are evenly spaced apart from each other.

31. A method for use in manufacturing a spoked bicycle wheel, comprising the steps of:
 a) providing a rim element comprising:
  i) a tire coupling channel; and
  ii) at least one spoke attachment chamber with at least one opening, a plurality of spoke attachment seats, an inside area within the chamber, and an outside area outside the chamber;
 b) inserting a spoke attachment element inside the at least one spoke attachment chamber through the at least one opening, the spoke attachment element comprising:
  i) a head;
  ii) a shank suitable for extending through and protruding from the spoke attachment seat; and
  iii) a portion that attaches the spoke attachment element to a spoke;
 c) guiding the spoke attachment element along a circumferential direction of the at least one spoke attachment chamber to the spoke attachment seat;
 d) aligning the shank of the spoke attachment element with the spoke attachment seat; and
 e) holding the spoke attachment element aligned with the spoke attachment seat.

32. A method for use in manufacturing a spoked bicycle wheel, comprising the steps of:
 a) providing a rim element comprising:
  i) a tire coupling channel; and
  ii) at least one spoke attachment chamber with at least one opening, a plurality of spoke attachment seats, an inside area within the chamber, and an outside area outside the chamber;
 b) inserting a spoke attachment element inside the at least one spoke attachment chamber through the at least one opening, the spoke attachment element comprising:
  i) a head;
  ii) a shank suitable for extending through and protruding from the spoke attachment seat; and
  iii) a portion that attaches the spoke attachment element to a spoke;
 c) guiding the spoke attachment element to the spoke attachment seat;
 d) aligning the shank of the spoke attachment element with the spoke attachment seat;
 e) holding the spoke attachment element aligned with the spoke attachment seat; and
 f) providing the spoke attachment element with a ferromagnetic insert, step f) being carried out before step b); and
 wherein said step c) comprises:
 g) attracting the spoke attachment element using a magnet interacting magnetically with the ferromagnetic insert.

33. The method of claim 32 wherein the insert is removably attached to the spoke attachment element portion that attaches.

34. The method of claim 33 further comprising the step:
 i) removing the insert and attaching a spoke with the spoke attachment element after the holding step e).

35. The method of claim 33 wherein holding step e) comprises removing the insert and attaching a spoke to the spoke attachment element.

36. The method of claim 33 wherein the insert has a free end with a bevelled or partially spherical head that protrudes from the spoke attachment element.

37. The method of claim 32 wherein the insert is irremovably attached to the spoke attachment element.

38. A method for use in manufacturing a spoked bicycle wheel, comprising the steps of:
 a) providing a rim element comprising:
  i) a tire coupling channel; and
  ii) at least one spoke attachment chamber with at least one opening, a plurality of spoke attachment seats, an inside area within the chamber, and an outside area outside the chamber;
 b) inserting a spoke attachment element inside the at least one spoke attachment chamber through the at least one opening, the spoke attachment element comprising:
  i) a head;
  ii) a shank suitable for extending through and protruding from the spoke attachment seat; and
  iii) a portion that attaches the spoke attachment element to a spoke;
 c) guiding the spoke attachment element to the spoke attachment seat;
 d) aligning the shank of the spoke attachment element with the spoke attachment seat; and
 e) holding the spoke attachment element aligned with the spoke attachment seat;
 wherein guiding step c) and aligning step d) are carried out through the steps of:
 j) extending a semi-rigid cable inside the at least one spoke attachment chamber between the spoke attachment seat and a preselected one of the at least one opening;
 k) removably attaching the semi-rigid cable to the spoke attachment element preventing the movement of the spoke attachment element with respect to the semi-rigid cable in a first direction (X) from the spoke attachment seat to the opening;
 l) pulling the semi-rigid cable in a second direction (Y) opposite the first direction (X);
 wherein steps j) and k) are carried out in any order;
 wherein during or after holding step e), the following step takes place:
 m) releasing the semi-rigid cable from the spoke attachment element and drawing out the semi-rigid cable from the at least one spoke attachment chamber.

39. The method of claim 38 wherein the extending step j) is carried out before attaching step k) by inserting one end of the semi-rigid cable in the at least one spoke attachment chamber from the spoke attachment seat and drawing it out from the at least one opening.

40. The method of claim 38 wherein the extending step j) is carried out after attaching step k) by inserting one end of the semi-rigid cable in the at least one spoke attachment chamber from the at least one opening and drawing it out from the spoke attachment seat.

41. The method of claim 38 wherein the attaching step k) comprises threading the semi-rigid cable in a hole of the spoke attachment element and bending one end of the semi-rigid cable, and the releasing step m) is carried out by pulling the semi-rigid cable until the bent one end is unbent and the semi-rigid cable is released from the spoke attachment element.

42. The method of claim 38 wherein the attaching step k) comprises attaching a terminal of the semi-rigid cable to the portion that attaches and the releasing step m) is carried out by freeing the terminal of the semi-rigid cable from the portion that attaches.

43. The method of claim 38 wherein the attaching step k) comprises threading the semi-rigid cable in a hole of the spoke attachment element and widening the section of the semi-rigid cable at an intermediate point adjacent to the head of the spoke attachment element and releasing step m) is carried out by pulling the semi-rigid cable in the first direction (X).

* * * * *

UNITED STATES PATENT AND TRADEMARK OFFICE
CERTIFICATE OF CORRECTION

| | | |
|---|---|---|
| PATENT NO. | : 7,866,045 B2 | Page 1 of 1 |
| APPLICATION NO. | : 11/707519 | |
| DATED | : January 11, 2011 | |
| INVENTOR(S) | : Mario Meggiolan et al. | |

It is certified that error appears in the above-identified patent and that said Letters Patent is hereby corrected as shown below:

On the Title page, at section (75), under "Inventors", in line 1, after the word "Meggiolan," delete "Vicenza" and insert therefore --Creazzo--.

In claim 16, at column 14, line 30, after the words "method of", delete "claims" and insert therefor --claim--.

In claim 24, at column 14, line 61, after the words "method of", delete "claims" and insert therefor --claim--.

In claim 25, at column 14, line 63, after the word "comprising", delete "step:" and insert therefor --the step:--.

Signed and Sealed this
Twenty-first Day of February, 2012

David J. Kappos
*Director of the United States Patent and Trademark Office*